(12) United States Patent
Albrecht

(10) Patent No.: US 10,655,751 B2
(45) Date of Patent: May 19, 2020

(54) HOSE BIB HANDLE REPLACEMENT SYSTEM

(71) Applicant: Kevin Albrecht, Chino Hills, CA (US)

(72) Inventor: Kevin Albrecht, Chino Hills, CA (US)

(*) Notice: Subject to any disclaimer, the term of this patent is extended or adjusted under 35 U.S.C. 154(b) by 15 days.

(21) Appl. No.: 16/141,340

(22) Filed: Sep. 25, 2018

(65) Prior Publication Data

US 2019/0195387 A1 Jun. 27, 2019

Related U.S. Application Data

(63) Continuation-in-part of application No. 15/680,206, filed on Aug. 18, 2017, now abandoned.

(51) Int. Cl.
*F16K 31/60* (2006.01)

(52) U.S. Cl.
CPC ............ *F16K 31/607* (2013.01); *F16K 31/60* (2013.01)

(58) Field of Classification Search
CPC ...... F16K 31/50; F16K 31/504; F16K 31/607; Y10T 137/6024
See application file for complete search history.

(56) References Cited

U.S. PATENT DOCUMENTS

| | | | | |
|---|---|---|---|---|
| 2,898,776 A | * | 8/1959 | Spencer | G05G 1/12 74/553 |
| 3,301,580 A | * | 1/1967 | Greitzer | F16K 31/60 403/23 |
| 4,716,922 A | * | 1/1988 | Camp | E03B 9/02 137/296 |
| 4,876,766 A | * | 10/1989 | Cohen | F16K 31/602 16/426 |
| 6,584,649 B1 | * | 7/2003 | Lichtenberg | 16/441 |
| 2010/0224273 A1 | * | 9/2010 | Motley | B67D 1/1405 137/801 |
| 2011/0042600 A1 | * | 2/2011 | Malone | F16K 31/607 251/293 |
| 2014/0339451 A1 | * | 11/2014 | Casebier | F16K 31/60 251/231 |

* cited by examiner

*Primary Examiner* — Reinaldo Sanchez-Medina

(57) ABSTRACT

A hose bib handle replacement comprises a handle portion and an adapter. The adapter has a wall defining an open interior sized to receive a portion of a hose bib. The handle portion is attached or attachable to the top surface of the adapter and has a radial dimension larger than the adapter. The adapter comprises a clamping mechanism adapted to clamp onto the portion of the hose bib in the interior, wherein the clamping mechanism can clamp onto different size and shape portions of the hose bib. In one version, the clamping mechanism comprises a plurality of set screws and wherein the set screws have a length where they can clamp different size and shape portions of the hose bib and when clamped do not extend outwardly beyond the wall of the adapter more than about 0.25 inches.

18 Claims, 4 Drawing Sheets

HOSE BIB HANDLE REPLACEMENT SYSTEM

PRIORITY

The present application is a Continuation-in-Part and claims the benefit of U.S. Non-Provisional patent application Ser. No. 15/680,206 filed on Aug. 18, 2017, the entirety of which is incorporated herein by reference.

BACKGROUND

No one likes having to call a plumber. It is expensive, stressful, and time consuming. However, many plumbing issues are too complicated or difficult for the do-it-yourselfer because they require know-how, tools, and/or specific parts. This can be particularly frustrating for tasks that seem like they should be easy to do without the need for a professional.

An example of a seemingly simple task that is heretofore anything but simple is the replacement of a hose bib faucet handle. Traditional faucets include at least one faucet handle which is rotated to open and close a valve for controlling the flow of water to a delivery spout. The faucet handle is coupled to the valve stem. When the faucet handle needs to be replaced, finding a faucet handle which will fit into the existing valve stem is cumbersome due to the various shapes and sizes of the valve stem, such as square, round, threaded, metric, standard, keyhole etc. Furthermore, the threaded and welded attachments of the hose bib often require complete replacement of the hose bib, and plumbing knowledge to be able to replace the handle with a new handle.

Existing hose bib adapters require the specific valve stems in order to work. For example, a universal faucet handle structure is disclosed in U.S. Pat. No. 8,832,905 B2 and requires the existing stem uses a threaded attachment. If the stem is not threaded, then the components disclosed in the U.S. Pat. No. 8,832,905 B2 do not work. Furthermore, the existing universal hose bib adapters and methods require a person expert in the plumbing work, possibly welding knowledge and operational knowledge of the plumbing fixtures in a home. Further still, the existing universal hose bib adapters fail to evenly distribute torque and fail to provide an adapter which is readily combined with various decorative fixtures.

Therefore, there is a need for a hose bib handle replacement system that is universally applicable. There is further a need for a hose bib handle replacement system that is easy and effective to use. There is further a need for a hose bib handle replacement system that is clampable onto various sizes, shapes, and designs of hose bibs. There is still further a need for a hose bib handle replacement system that allows for decorative and aesthetically pleasing handles to be easily installed on a hose bib.

SUMMARY

The present invention satisfies these needs. In one aspect of the invention, a hose bib hand replacement system includes a universal adapter and clamping mechanism that allows the system to be used with any size, shape, and design of hose bib.

In another aspect of the invention, a hose bib handle replacement system comprises a handle portion, and an adapter having wall defining an open interior sized to receive a portion of a hose bib, wherein the handle portion is attached or attachable to the top surface of the adapter and has a radial dimension larger than the adapter, wherein the adapter comprises a clamping mechanism adapted to clamp onto the portion of the hose bib in the interior, and wherein the clamping mechanism can clamp onto different size and shape portions of the hose bib.

In another aspect of the invention, a hose bib handle replacement system comprises a handle portion, and an adapter having an open interior sized to receive a portion of a hose bib, wherein the handle portion is attached or attachable to the top surface of the adapter, wherein the adapter comprises a wall defining an open interior adapted to receive the portion of the hose bib, wherein the wall has a plurality of openings extending into the interior, wherein the adapter comprises a plurality of set screws each receivable in an opening and advanceable into the interior where they can contact the portion of the hose bib to clamp it, and wherein the set screws have a length where they can clamp different size and shape portions of the hose bib and when clamped do not extend outwardly beyond the wall of the adapter more than about 0.25 inches.

In another aspect of the invention, a method of replacing a handle on a hose bib comprises removing an existing handle on the hose bib to expose a stem or broach of the hose bib, providing an adapter having an open interior at its bottom and a handle portion on its top, positioning the open interior over the stem or broach of the hose bib, and moving a clamping mechanism of the adapter inwardly to clamp onto the stem or broach in the interior in a manner that prevents relative rotation of the adapter and the stem or broach.

DRAWINGS

These features, aspects, and advantages of the present invention will become better understood with regard to the following description, appended claims, and accompanying drawings which illustrate exemplary features of the invention. However, it is to be understood that each of the features can be used in the invention in general, not merely in the context of the particular drawings, and the invention includes any combination of these features, where:

DESCRIPTION

The present invention relates to a universal hose bib handle replacement system. In particular, the invention relates to a universal hose bib adapter and handle for easily replacing a handle on a hose bib. Although the invention is illustrated and described in the context of being useful with an outdoor faucet or outside spigot, the present invention can be used in other ways, as would be readily apparent to those of ordinary skill in the art. Accordingly, the present invention should not be limited just to the examples and embodiments described herein.

Figure 1:
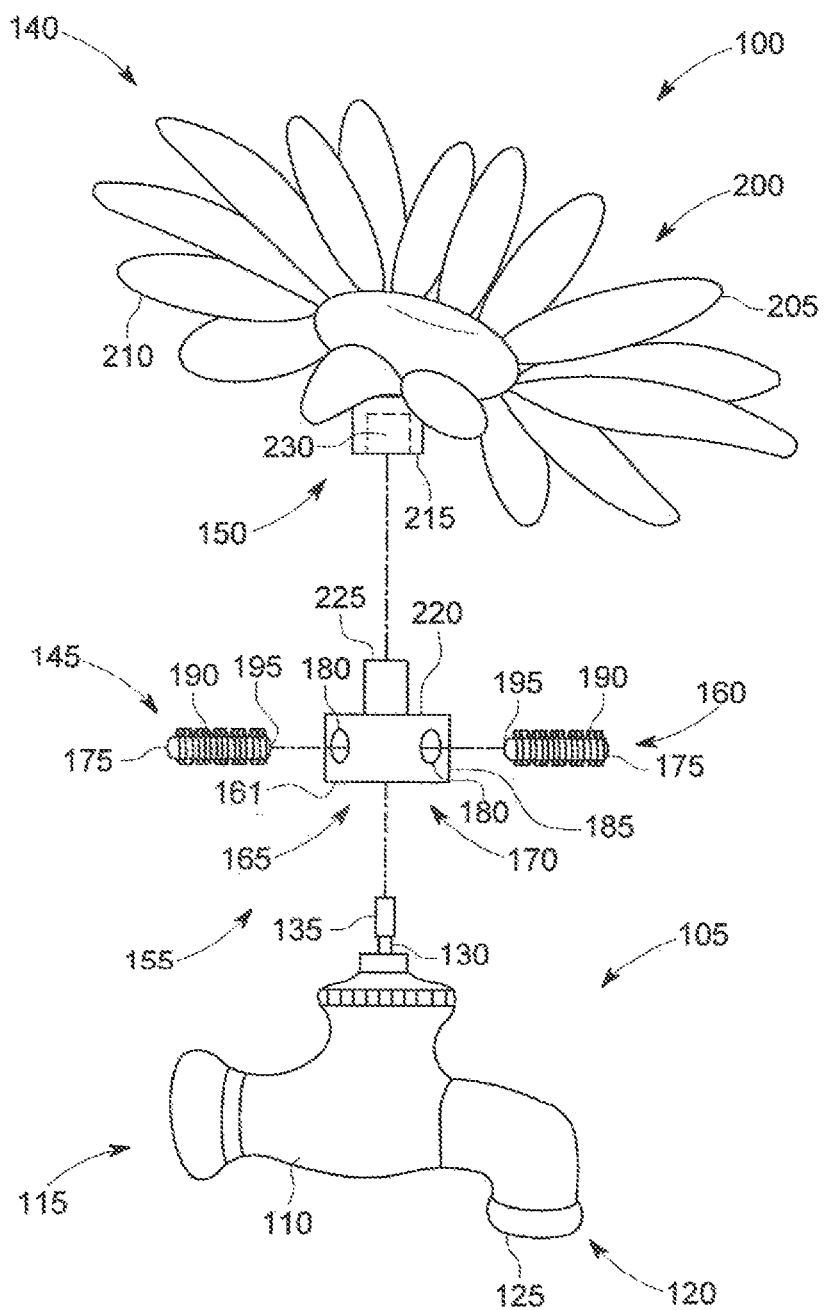
FIG. 1 is a schematic, exploded, perspective view of a hose bib handle replacement system of the present invention and a hose bib.

FIG. 1 shows a hose bib handle replacement system 100 according to one version of the invention in association with a hose bib 105 in need of a handle. The hose bib 105, also known as a hose bibb, an outside spigot, and an outdoor faucet, tap, or tap handle has a body 110 and is attached at a first end 115 to a water line that is connected to a source of water, such as a community water line, a well, or the like. Water can flow through the body 110 to an outlet 120 of the hose bib 105. The outlet 120 may be provided with a connector 125, such as threads, whereby a hose or the like may be connected to the outlet 120. Within the body 110 a valve (not shown) is provided that selectively allows and prevents the flow of water from the first end 115 to the outlet 120. The opening and closing of the valve is controlled by rotation of a stem 130 extending from the top of the body 110 of the hose bib 105. The stem 130 can include a broach 135 to help facilitate turning of the stem 130. Conventionally, a handle is provided with the hose bib 105 that mates with the broach 135 to further facilitate turning of the broach 135 and thus subsequent opening and closing of the valve depending on the direction the broach 135 and stem 130 are rotated. Numerous stem 130 and broach 135 designs are available, and each design uses a corresponding handle designed specifically for each stem 130 and broach 135 design. Thus, handles designed for one type of stem 130 and broach 135 are generally not compatible with another design.

The handle replacement system 100 of the invention is designed to provide for universal connection of a replacement handle onto any of the various stem 130 and broach 135 designs. The handle replacement system 100 is made up of a handle portion 140 and an adapter 145. The handle portion 140 and the adapter 145 are connected to one another by a connection mechanism 150 that allows torsion applied to the handle portion 140 to be transmitted to the adapter 145 so the handle 140 and the adapter 145 turn as a unit. The adapter 145 includes a clamping mechanism 155 that allows the adapter 145 to clamp onto the stem 130 and/or the broach 135 of a hose bib 105. The clamping mechanism 155 allows torque to be transferred from the adapter 145 to the stem 130 and/or broach 135 so that rotation of the handle portion 140 causes rotation of the adapter 145 which causes rotation of the stem 130 and/or broach 135.

As shown in FIG. 1, the clamping mechanism 155 includes one or more clamping members 160 that adjustably engage an outer surface of the stem 130 and/or broach 135 of the hose bib 105. In this version, the adapter 145 has a bottom 161 with an opening 165 into an interior 170 of the adapter 145. The adapter 145 is slid over the stem 130 and/or broach 135 so that the stem 130 and/or broach 135 are received within the interior 170 of the adapter 145. The one or more clamping members 160 then can lockingly engage the stem 130 and/or broach 135 so that the adapter 145 is clamped onto the stem 130 and/or broach 135. In one version, the interior has a radial dimension at the bottom 161 of from about 0.3 to about 0.7 inches in diameter or cross-sectional width, more preferably from about 0.4 to about 0.5 inches in diameter or cross-sectional width.

In one version, the one or more clamping members 160 can include one or more set screws 175 or anchor screws, and more preferably a plurality of set screws 175. Each set screw 175 is receivable in an opening 180 in adapter 145. Each opening 180 extends from an outer wall 185 of the adapter 145 to the interior 170 and includes threads that can engage threads 190 on the set screw 175. As the set screw 175 is rotated in a first rotational direction, it advances within the opening 180, and as it is rotated in the opposite direction, the set screw 175 it withdraws from the opening. In use, each set screw 175 is advanced until a forward end 195 of the set screw 195 contacts and engages the stem 130 and/or broach 135 of the hose bib 105.

The handle portion 140 of the replacement handle system 100 can be a conventional spigot handle or any other design. For example, the handle portion 140 can have a decorative design 200 such as the flower design 205 shown in FIG. 1. The conventional or decorative design 200 serves the purpose of increasing the radius of the handle portion 140 thereby increasing the moment for applying torque. In the flower design 205 version, the petals 210 serve as moment increasers. In one version, the handle portion 140 has a radial dimension that is larger than the longest radial dimension of the adapter 145, more preferably at least two times longer, and more preferably at least three times longer. By radial dimension it is meant a dimension extending radially outwardly from an axis passing through the center of the adapter 145 and the stem 130 or broach 135 of the hose bib when attached and along a plane that is perpendicular to that axis.

The handle portion 140 can be connected to the adapter 145 by any of a number of connection mechanisms 150. In the version of FIG. 1, the handle portion includes a core member 215 that is attached to the top 220 of the adapter 145. In one particular version, a post 225 extends from the top 220 of the adapter 145, and the post 225 is insertable into a cavity 230 in the core member 215. The post 225 is received within the cavity 230 in a manner that prevents relative rotation between the post 225 and the core member 215. For example, the post 225 and the cavity 230 can have mating geometric configurations that have cross-sectional shapes that prevent rotation, such as one or more of a triangle, square, rectangle, or other polygon, either with rounded or sharp corners; multiple teeth or one or more keys extending from a dowel; a circle with one or more flat sides; and an oval or elliptical shape. Alternatively, a non-rotatable cap and socket system or stud and eyelet system, either toothed or smooth can be provided. A tubular type of attachment system that includes a male shaft with dimpled, V-slotted, or sheared embosses alone or in combination with a female sleeve can alternatively be provided. Other examples of suitable connection mechanisms 150 include cam fasteners with cam lock disks, cam fasteners with dimples, V-slotted, or sheared emboss. In another version, the post 225 and the cavity 230 can have engageable threads. In this version, it is desirable to be able to lock the pieces against relative rotation once the post 225 is threaded into the cavity 230. For example, a slot and pin can be provided, a locking nylon patch can be provided on the threading, or adhesive such as glue can be applied after the pieces are threaded together. In another version, the post and cavity arrangement can be reversed so the post is on the handle portion 140 and the cavity is on the adapter. In yet another version, the handle portion 140 and the adapter 145 are permanently attached, such as by adhesive, by welding, or by being formed from a single piece.

Figure 2A:
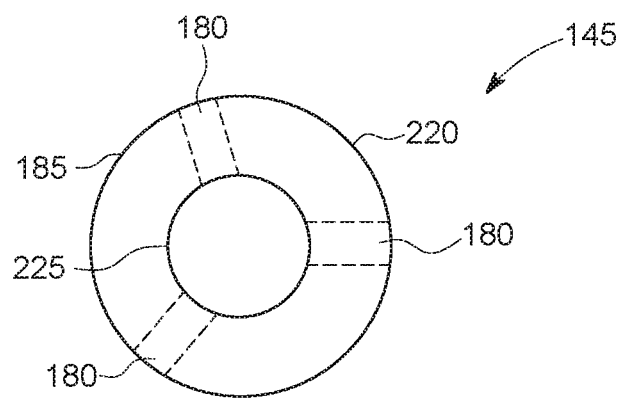
FIG. 2A is a schematic top view of an adapter of a hose bib handle replacement system.
Figure 2B:
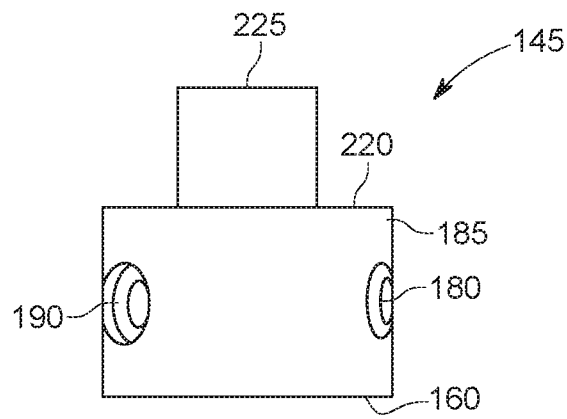
FIG. 2B is a schematic side view of the adapter of FIG. 2A.
Figure 2C:
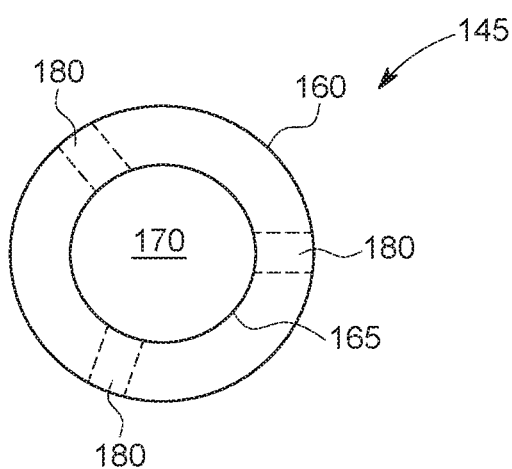
FIG. 2C is a schematic bottom view of the adapter of FIG. 2A.

A particular version of an adapter 145 is shown in FIGS. 2A, 2B, and 2C, which show a top view, a side view, and a bottom view of this version of the adapter 145, respectively. In this version, three openings 180 are provided through the wall 185 of the adapter 145 for receiving set screws. Preferably, the openings are positioned equal distance from one another around the wall 185. Accordingly, for a cylindrically shaped wall 185, the three openings 180 are each about 120 degrees from one another. This arrangement allows the set screws 175 to clamp onto the stem 130 and/or broach 135 in equal and harmonizing fashion to help provide a strong clamp and to help reduce relative rotation between the parts. Alternatively, there can be more openings 180 provided that are equally spaced, such as four openings 180 spaced about every 90 degrees; five openings spaced about every 72 degrees; six openings spaced about every 60 degrees; etc. While the wall 185 is cylindrical in the version shown, it can take on any other shape. By "120 degrees" and the other angles, it is meant the angle of the openings and/or inserted set screws relative to one another.

The three-opening version of FIGS. 2A, 2B, and 2C has been discovered to provide additional advantages. First, it is easier to install a system having three set-screws to insert than one that has four or more. In addition, the three set screws evenly distribute the torque and provide a secure clamp on the stem 130 and/or broach 135. The equilateral triangular force provides strong torque with less force and has been found to be the best configuration for longevity.

Figure 3A:
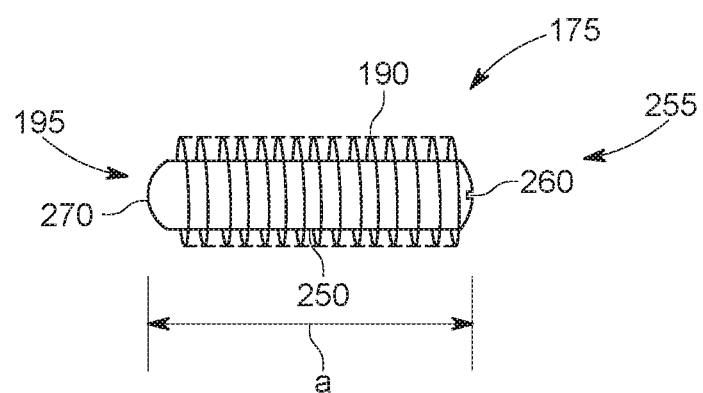
FIG. 3A is a schematic side view of a set screw or anchor screw for use with the hose bib handle replacement system.

A version of a set screw 175 for use in the handle replacement handle 100 is shown in FIG. 3A. The set screw 175 is made up of an elongated shaft 250 having exterior threads 190. At a first end 255 of the set screw 175 is a slot 260 for receiving a screw driver or the like for rotating the set screw 175. The slot 260 can be a standard flat slot, a phillips shaped slot, or other shaped key or projection. The other end of the set screw 175 is the forward end 195 and has a contact surface 270 that is shaped and configured to engage the stem 130 and/or broach 135 of the hose bib 105. The contact surface may have a cup point. The cup point is a cup-shaped projection on the forward end 195 that allows two points of contact on the stem 130 and/or broach 135 for improved contact due to the increased surface area of the contact. In one particular version, the set screw 175 has a diameter of at least 3/16 inches to allow for a desirable amount of torque to be applied to the set screw 175 during tightening. Smaller set screws can be provided, though, especially if reinforced to allow for high amounts of torque before breakage. The set screw 175 may also have a nylon coating. The nylon coating can prevent the set screw 175 wiggling and backing out of the opening 180. The nylon acts as a lock on the screw, making it secure enough in the opening 180 to prevent backing out.

In one version, the length of the set screw 175 from the first end 255 to the second end 265 is selected to establish a secure clamp with a wide variety of stem 130 and/or broach 135 designs and shapes while maintaining a low profile and/or improving the aesthetics of the handle replacement system 100. Accordingly, in this version, the set screw 175 has a length, a, from the first end 255 to the forward end 195 of from about 0.1 inch to about 0.5 inches, more preferably from about 0.12 inch to about 0.25 inches, and most preferably from about 0.15 inches to about 0.16 inches.

Figure 3B:
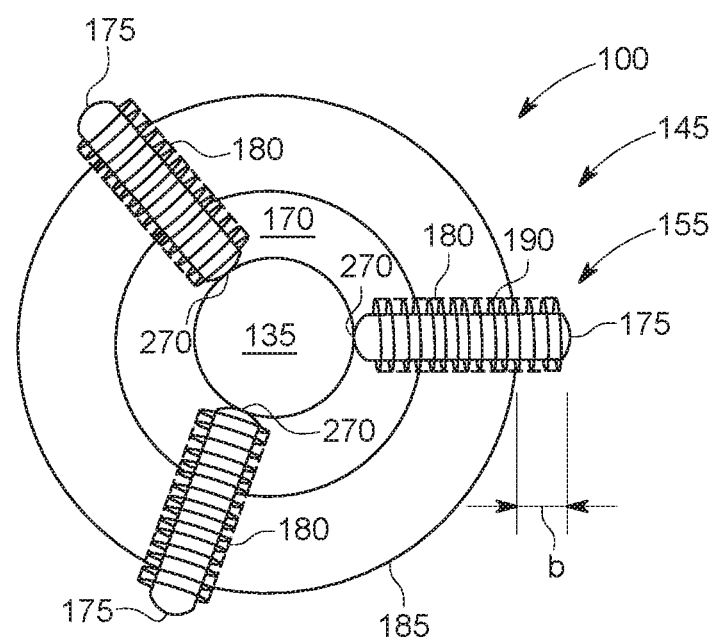
FIG. 3B is a schematic sectional view of the hose bib handle replacement system attached to a hose bib.

The advantages of a proper length set screw 175 can be seen in FIG. 3B which shows a cross-section of the handle replacement system 100 installed onto a broach 135 of a hose bib 105. The set screws 175 need to be sufficiently long that they can contact any size stem 130 and/or broach 135 in the interior 170 of the adapter 145 but are not so long that they extend outwardly from the wall 185 of the adapter 145 an undesirable amount. In one version, the set screws 175 extend outwardly from the wall 185 a distance, b, of less than 0.25 inches, more preferably less than 0.13 inches, more preferably less than 0.07 inches, and most preferably flush or less, no matter the size of the stem 130 and/or broach 135 in the interior 170 that is being clamped onto. In one version, the handle replacement system 100 can be provided with set screws 175 having different lengths, a, so that a proper length set screw can be selected based on the size and/or configuration of the stem 130 and/or broach 135. For example, the handle replacement system 100 can have three set screws having a length of from about 0.12 inches to about 0.25 inches and a set of three set screws having a length longer than the first set and of from about 0.2 to about 0.5 inches.

Figure 4:
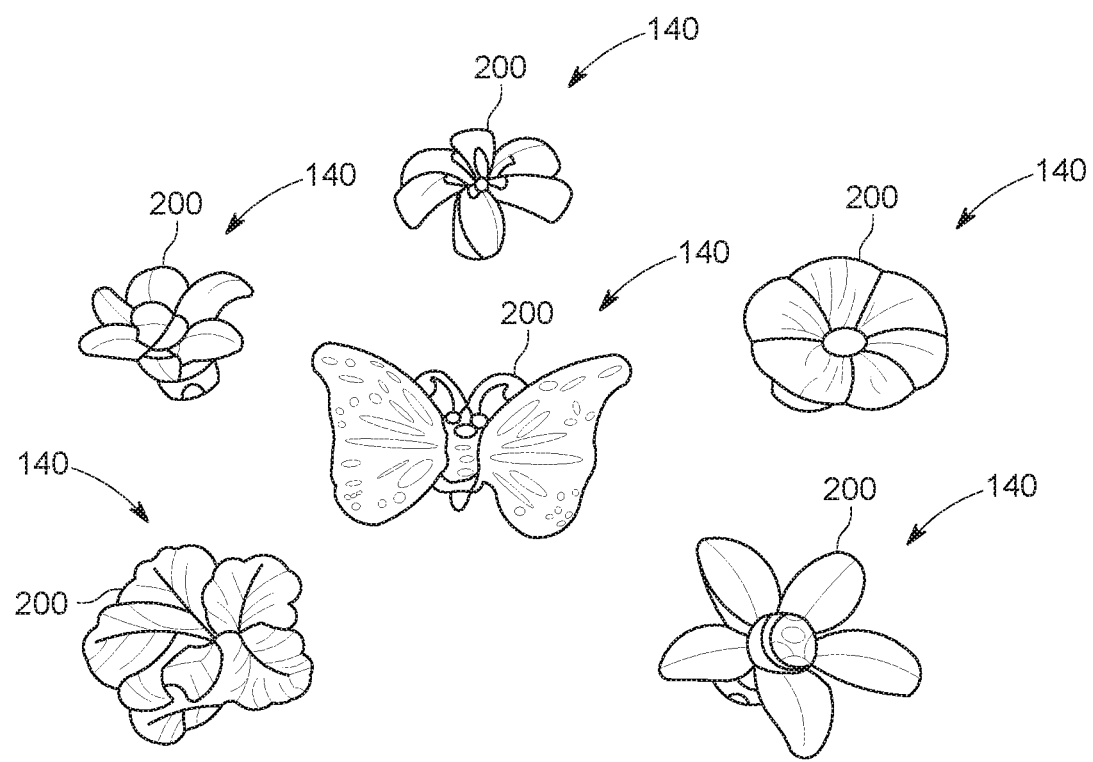
FIG. 4 is a schematic perspective view of various decorative handles for use with the hose bib handle replacement system.

FIG. 4 shows various alternative decorative designs 200 that can be used as the handle portion 140 of the handle replacement system 100. The handle portions 140 can be provided pre-attached to the adapter 145 or separate from the adapter 145. In one version, multiple, different decorative designs 200 can be provided so the user can switch out the decorative designs periodically.

The manner of using the handle replacement system 100 is apparent from the Figures. To install a new handle, a user first removes an old handle from an existing hose bib 105 to expose the stem 130 and/or broach 135. The adapter 145 with a handle portion 140 attached to its top 220 is slid onto the stem 130 and/or broach 135 so the stem 130 and/or broach 135 is received within the interior 170 of the adapter 145. The user then clamps the adapter onto the stem 130 and/or broach 135 for example by inserting the set screws 175 into the openings 180 and screwing in the set screws until all make strong contact with the stem 130 and/or broach 135. Once installed, rotation of the handle portion 140 will result in rotation of the stem 130 and/or broach 135 thus allowing the user to control the operation of the hose bib 100 with the new handle portion 140.

Thus the handle replacement system 100 allows the user to change the handle of a hose bib 105 with a simple hand tool with no plumbing knowledge. Further, the present adapter 145 evenly distributes the torque of the set screws 175 to secure the replacement handle on the hose bib 105 no matter the size, shape, and design of the hose bib 105 and its components. Furthermore, the adapter 145 readily is attachable to multiple decorative designs 200 for the handle portion 140.

Although the present invention has been described in considerable detail with regard to certain preferred versions thereof, other versions are possible, and alterations, permutations and equivalents of the version shown will become apparent to those skilled in the art upon a reading of the specification and study of the drawings. For example, the cooperating components may be reversed or provided in additional or fewer number. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

What is claimed is:

1. A hose bib handle replacement system, the system comprising:
 a handle portion, and
 an adapter having an at least partially cylindrical wall defining an open interior sized to receive a portion of a hose bib,
 wherein the handle portion is attached or attachable to a top surface of the adapter and has a radial dimension larger than the adapter, wherein the adapter comprises a clamping mechanism comprising a plurality of openings substantially equally spaced around the wall and a plurality of clamping members each receivable in an opening and adapted to clamp onto the portion of the hose bib in the interior, wherein the clamping mechanism can clamp onto different size and shape portions of the hose bib, and wherein the adapter can be clamped onto the portion of the hose bib in the interior when the handle portion is attached to the adapter.

2. A system according to claim 1 wherein the clamping members are set screws, each threadably receivable in one of the plurality of openings.

3. A system according to claim 1 wherein the clamping mechanism comprises three openings in the wall of the adapter that each extend into the interior and three set screws that are each receivable in a respective opening and that can be advanced into the interior.

4. A system according to claim 3 wherein the three openings are spaced at 120 degrees around the wall.

5. A system according to claim 1 wherein the clamping mechanism comprises four or more openings in the wall of the adapter that each extend into the interior and at least a corresponding number of set screws that are each receivable in a respective opening and that can be advanced into the interior, and wherein the openings are equally spaced around the wall of the adapter.

6. A system according to claim 1 wherein the open interior has a cross-sectional dimension at the bottom of the adapter of from 0.3 inches to 0.7 inches.

7. A system according to claim 1 wherein the handle portion has a radial dimension larger than the largest radial dimension of the adapter.

8. A system according to claim 1 wherein the handle portion has a radial dimension at least two times larger than the largest radial dimension of the adapter.

9. A system according to claim 1 wherein the handle portion has a radial dimension at least three times larger than the largest radial dimension of the adapter.

10. A system according to claim 1 wherein the clamping members are set screws, each being receivable in an opening in the wall of the adapter, and each set screw having a length where it can clamp different size and shape portions of the hose bib and when clamped does not extend outwardly beyond the wall of the adapter more than 0.25 inches.

11. A hose bib handle replacement system, the system comprising:
a handle portion, and
an adapter having an open interior sized to receive a portion of a hose bib,
wherein the handle portion is attached or attachable to a top surface of the adapter, wherein the adapter comprises a wall defining the open interior, wherein the wall has a plurality of openings substantially equally spaced around the wall and extending into the interior, wherein the adapter comprises a plurality of set screws each receivable in an opening and advanceable into the interior where they can contact the portion of the hose bib to clamp it, wherein the set screws have a length where they can clamp different size and shape portions of the hose bib and when clamped do not extend outwardly beyond the wall of the adapter more than 0.25 inches, and wherein the adapter can be clamped onto the portion of the hose bib in the interior when the handle portion is attached to the adapter.

12. A system according to claim 11 wherein when clamped the set screws do not extend outwardly more than 0.13 inches beyond the wall of the adapter.

13. A system according to claim 11 wherein the wall has three openings spaced at 120 degrees around the wall.

14. A system according to claim 11 wherein each set screw has a forward end comprising a cup point.

15. A system according to claim 11 wherein each set screw has a nylon coating.

16. A system according to claim 11 wherein the handle portion has a radial dimension larger than the largest radial dimension of the adapter.

17. A method of replacing a handle on a hose bib, the method comprising:
removing an existing handle on the hose bib to expose a stem or broach of the hose bib,
providing an adapter having an open interior at its bottom and a handle portion on its top,
attaching the handle portion to the top of the adapter and thereafter positioning the open interior over the stem or broach of the hose bib, and
moving a clamping mechanism of the adapter inwardly to clamp onto the stem or broach in the interior in a manner that prevents relative rotation of the adapter and the stem or broach.

18. A method according to claim 17 wherein the clamping mechanism comprises three clamping members substantially equally spaced around the adapter.

* * * * *